United States Patent
Foinet et al.

(10) Patent No.: US 9,671,787 B2
(45) Date of Patent: Jun. 6, 2017

(54) METHOD OF DYNAMIC CONTROL OF A ROTARY- WING DRONE IN THROW START

(71) Applicant: PARROT, Paris (FR)

(72) Inventors: Gilles Foinet, Paris (FR); Mathieu Babel, Paris (FR); Yoni Benatar, Les Lilas (FR)

(73) Assignee: Parrot Drones, Paris (FR)

( * ) Notice: Subject to any disclaimer, the term of this patent is extended or adjusted under 35 U.S.C. 154(b) by 156 days.

(21) Appl. No.: 14/834,865

(22) Filed: Aug. 25, 2015

(65) Prior Publication Data

US 2016/0062364 A1 Mar. 3, 2016

(30) Foreign Application Priority Data

Aug. 26, 2014 (FR) ...................................... 14 57989

(51) Int. Cl.
 *G05D 1/04* (2006.01)
 *G05D 1/06* (2006.01)
 (Continued)

(52) U.S. Cl.
 CPC ........... *G05D 1/0661* (2013.01); *A63H 27/12* (2013.01); *A63H 27/14* (2013.01); *G05D 1/0011* (2013.01);
 (Continued)

(58) Field of Classification Search
 CPC .. G05D 1/0653; G05D 1/0661; G05D 1/0669; G05D 1/0808–1/0866;
 (Continued)

(56) References Cited

U.S. PATENT DOCUMENTS 8,983,684 B2   3/2015   Callou et al.
8,989,924 B2   3/2015   Seydoux et al.
(Continued)

FOREIGN PATENT DOCUMENTS

EP   2541359 A1   1/2013
EP   2644240 A1   10/2013
(Continued)

OTHER PUBLICATIONS

Lupashin et al., A simple learning strategy for high-speed quadrocopter multi-flips, 2010 IEEE Conference on Robotics and Automation, pp. 1642-1648 (May 3, 2010).
(Continued)

*Primary Examiner* — Spencer Patton
(74) *Attorney, Agent, or Firm* — Marshall, Gerstein & Borun LLP

(57) ABSTRACT

A new method of dynamic control of a rotary-wing drone in throw start includes the steps of: a) initializing a predictive-filter altitude estimator; b) the user throwing the drone in the air with the motors turned off; c) detecting the free fall state; d) upon detecting the free fall state, fast start with turn-on of the motors, open-loop activation of the altitude control means, and closed-loop activation of the attitude control means; e) after a motor response time, stabilizing the drone by closed-loop activation of the altitude control means, and closed-loop activation of the attitude control means; f) detecting a stabilization state such that the total angular speed of the drone is lower than a predetermined threshold; and g) upon detecting the stabilization state, switching to a final state in which the drone is in a stable lift condition and pilotable by the user.

7 Claims, 5 Drawing Sheets

(51) Int. Cl.
*G05D 1/08* (2006.01)
*G05D 1/00* (2006.01)
*A63H 27/14* (2006.01)
*A63H 27/00* (2006.01)

(52) U.S. Cl.
CPC .......... *G05D 1/042* (2013.01); *G05D 1/0669* (2013.01); *G05D 1/0816* (2013.01)

(58) Field of Classification Search
CPC .............. G05D 1/042; B64C 2201/084; B64C 2201/088; A63H 27/14
See application file for complete search history.

(56) References Cited

U.S. PATENT DOCUMENTS

2016/0179096 A1\*  6/2016  Bradlow ................. B64C 19/00
                                                                        701/8
2016/0313742 A1\* 10/2016  Wang ................... G05D 1/0669

FOREIGN PATENT DOCUMENTS

WO    WO-2013/105926 A1    7/2013
WO    WO-2013/123944 A1    8/2013

OTHER PUBLICATIONS

Search Report, French Patent Application No. 1457989, Apr. 30, 2015.

\* cited by examiner

METHOD OF DYNAMIC CONTROL OF A ROTARY-WING DRONE IN THROW START

CROSS-REFERENCE TO RELATED APPLICATIONS

This application claims the benefit of priority to French Patent Application No. 1457989, filed Aug. 26, 2014, the disclosure of which is incorporated herein by reference in its entirety.

FIELD OF THE DISCLOSURE

The invention relates to the rotary-wing drones such as quadricopters and the like.

BACKGROUND

Such drones are provided with multiple rotors driven by respective motors that can be controlled in a differentiated manner so as to pilot the drone in attitude and speed.

A typical example of such a drone is the AR.Drone 2.0 of Parrot SA, Paris, France, which is a quadricopter equipped with a series of sensors (accelerometers, three-axis gyrometers, altimeter), a front camera capturing an image of the scene towards which the drone is directed, and a vertical-view camera capturing an image of the overflown ground.

The invention more particularly relates to the automatic control of such a drone to ensure a transition between:
an initial state, in which the drone motors are turned-off and hence in which the rotors are stopped, and
a final state, in which the drone is in a lift condition, i.e. its horizontal and vertical speeds are zero or almost-zero, as well as its inclination.

Most often, the initial state is a state in which the drone rests, still, on the ground. The user then triggers the turn-on of the motors from his remote control and makes the drone evolve by means of suitable commands, possibly after that, in a previous phase of auto-piloted take-off, the drone has automatically taken a lift condition at a predetermined height above the ground.

The invention relates to a method of dynamic control of the drone, which supports another technique of flight initiation, of the "throw start" type, in which the user holds the drone in his hand, motors turned-off, and releases or throws the latter into space.

The matter is then to ensure a fast turn-on of the motors so as to counter the free fall effect, and to automatically stabilize the drone in attitude and altitude before it has the time to fall to the ground.

The WO 2013/123944 A1 hence describes a drone that can be used in particular in rescue operations, for example in the form of a lifebuoy that would be thrown from a boat or from the dry land to a person in distress. The drone, initially put on the ground with its motors turned-off, is grasped and thrown by a rescuer towards the person in distress. The turn-on of the motors is automatic, and the drone places itself automatically in hovering flight above the person in distress to drop him/her a security equipment. However, this document does not describe the way the motors of the drone are precisely controlled and servo-controlled to perform safely and rapidly a transition between the initial state, at the time where the drone is thrown by the rescuer with its motors turned-off, and the stable lift state in hovering flight.

The problem of the invention is to ensure this stabilization in the most efficient and rapid manner possible during the previous phase of "throw start", which will last until the drone is stabilized enough to be able to quit the temporary auto-piloted mode and to transfer the control to the user.

This stabilization is all the more difficult to ensure that, unlike a start with a take-off from the ground, where the drone is still and the initial altitude is known (zero), in the case of a throw start, the initial conditions may vary in very large proportions, a priori unpredictable:
simple release, hence with a zero initial speed, or throw, with a more or less high initial impulse speed in a direction that is a priori unknown (rather upward, rather horizontal . . . );
flat throw or "spin" throw, introducing angular speed components;
height with respect to the ground at which the user releases or throws the drone;
external conditions: wind, ground effect or effect of a wall in the vicinity, etc.

It is also advisable to avoid or reduce to a minimum any incoherent effect of the motors during the phase of stabilization, for example any thrust exerted in the wrong direction, which would tend to push the drone towards the ground.

The EP 2 644 240 A1 describes in detail the operation of a Kalman-filter altitude estimator, but gives no indication about the way to use this estimator to control the drone motors in a "throw start" or "release start" configuration.

In another context, the article of Lupashin S et al. "A Simple Learning Strategy for High-Speed Quadrocopter Multi-Flips", Proceedings of the 2010 IEEE International Conference on Robotics and Automation, May 2010, pp. 1642-1648 describes how to control a drone of the quadricopter type to perform a manoeuvre of the "spin" or "somersault" type (rotation of the drone by a full turn about its roll axis or its pitch axis). But this manoeuvre is in any case performed starting from an initial lift state in which the motors are already activated—the matter is hence not to place the drone in a final lift state, from an initial state where the latter is thrown in some or other way with its motors turned-off. Moreover, this article describes how to optimize a number of parameters to generate a precise trajectory, always the same (spin or somersault), with pre-calculated commands of trajectory. Actually, such a method would be unsuited to the stabilization of a drone after some or other throw, whose initial parameters of speed and acceleration may be very variable and are in any case un-predictable. Finally, the transitions between the different steps of execution of the spin or the somersault always occur at the same time and are not a function of the initial movement of the drone: it is hence not necessary, in this case, to provide a particular strategy of control of an altitude estimator as a function of the initial conditions.

The object of the invention is, as mentioned hereinabove, to propose a method allowing, in the case of a throw start, to generate the transition from an initial state, in which the drone suddenly ends up in a free fall condition with its motors turned-off, to a final state in which the drone is stabilized in a lift condition at a certain height above the ground, and in which the control can be transferred to the user, the whole within a minimum time.

Such a method may be implemented, in a manner known per se for example from the above-mentioned WO 2013/123944 A1, with a drone comprising: accelerometer means, adapted to deliver values of acceleration of the drone; gyrometer means, adapted to deliver values of angular speed of the drone; altimeter means, adapted to deliver a value of altitude of the drone; altitude control means, comprising a servo-controlled loop operating based on an altitude setpoint; and attitude control means, comprising a servo-controlled loop operating based on an attitude set-point.

Characteristically of the invention, the altimeter means comprising a predictive-filter estimator incorporating a representation of a dynamic model of the drone and operating based on a state vector containing altitude and horizontal speed variables, and the method comprises the following steps:

a) initialization of the predictive-filter estimator;
b) throwing of the drone in the air by the user from the initial state, motors turned-off;
c) detection of a free fall state such that the norm of the drone acceleration is lower than a predetermined threshold for a predetermined minimum duration;
d) upon detection of said free fall state, fast start by:
   turn-on of the motors,
   open-loop activation of the altitude control means, and
   closed-loop activation of the attitude control means;
e) then, after a duration at least equal to a time of response of the motors to said turn-on, stabilization of the drone by:
   closed-loop activation of the altitude control means, and
   closed-loop activation of the attitude control means;
f) detection of a stabilization state such that the norm of the total angular speed ($|\Omega|$) of the drone is lower than a predetermined threshold; and
g) upon detection of the stabilization state, switching to the final state.

According to various subsidiary advantageous characteristics: the step a) of initialization of the predictive-filter estimator comprises the initialization of the state vector with an altitude variable comprised between 1 m and 2 m, a vertical speed variable positive upward and comprised between 0 and 200 cm/s, and/or an interval of confidence of the initial speed of the drone at a value comprised between 100 mm/s and 2000 mm/s;

at step d), the altitude control means activated in open loop operate based on a fixed altitude set-point corresponding to the initial state of the altitude estimator;

at step e), the altitude control means activated in closed loop operate based on a predetermined fixed altitude set-point; and at steps d) and e), the attitude control means activated in closed loop operate based on a zero trim set-point and a heading set-point corresponding to the current heading with a zero angular speed set-point.

BRIEF DESCRIPTION OF THE DRAWINGS

An exemplary embodiment of the invention will now be described, with reference to the appended drawings in which the same references denote identical or functionally similar elements throughout the figures.

DETAILED DESCRIPTION

Figure 1:
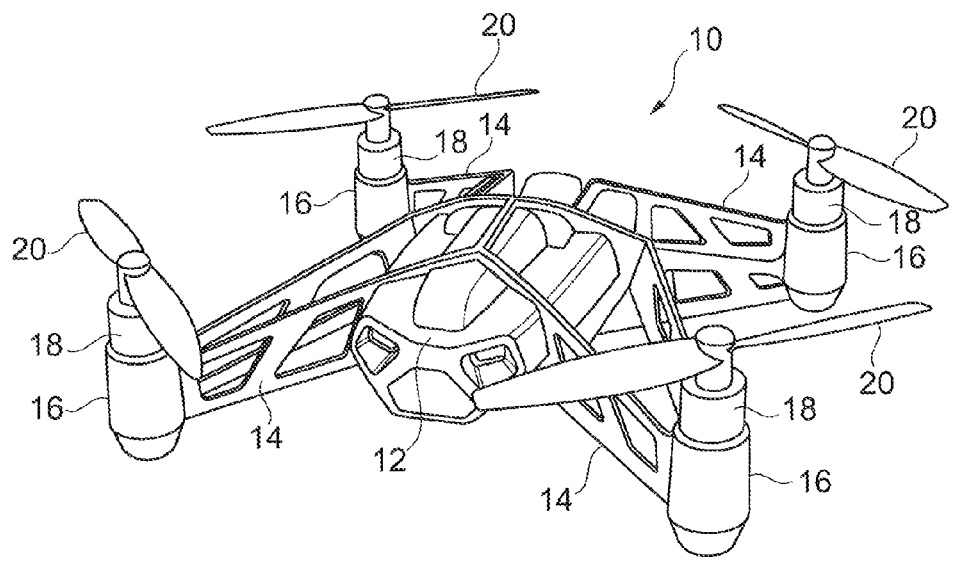
FIG. 1 is an overall view showing the drone and the main elements that compose it.

FIG. 1 shows a drone 10 of the quadricopter type, with a central body 12 from which radiate four support arms 14. Each support arm 14 is equipped at its distal end with a propulsion unit 16 comprising a motor 18 driving into rotation a propeller 20 extending in a horizontal plane above the support arm 14.

Figure 3:
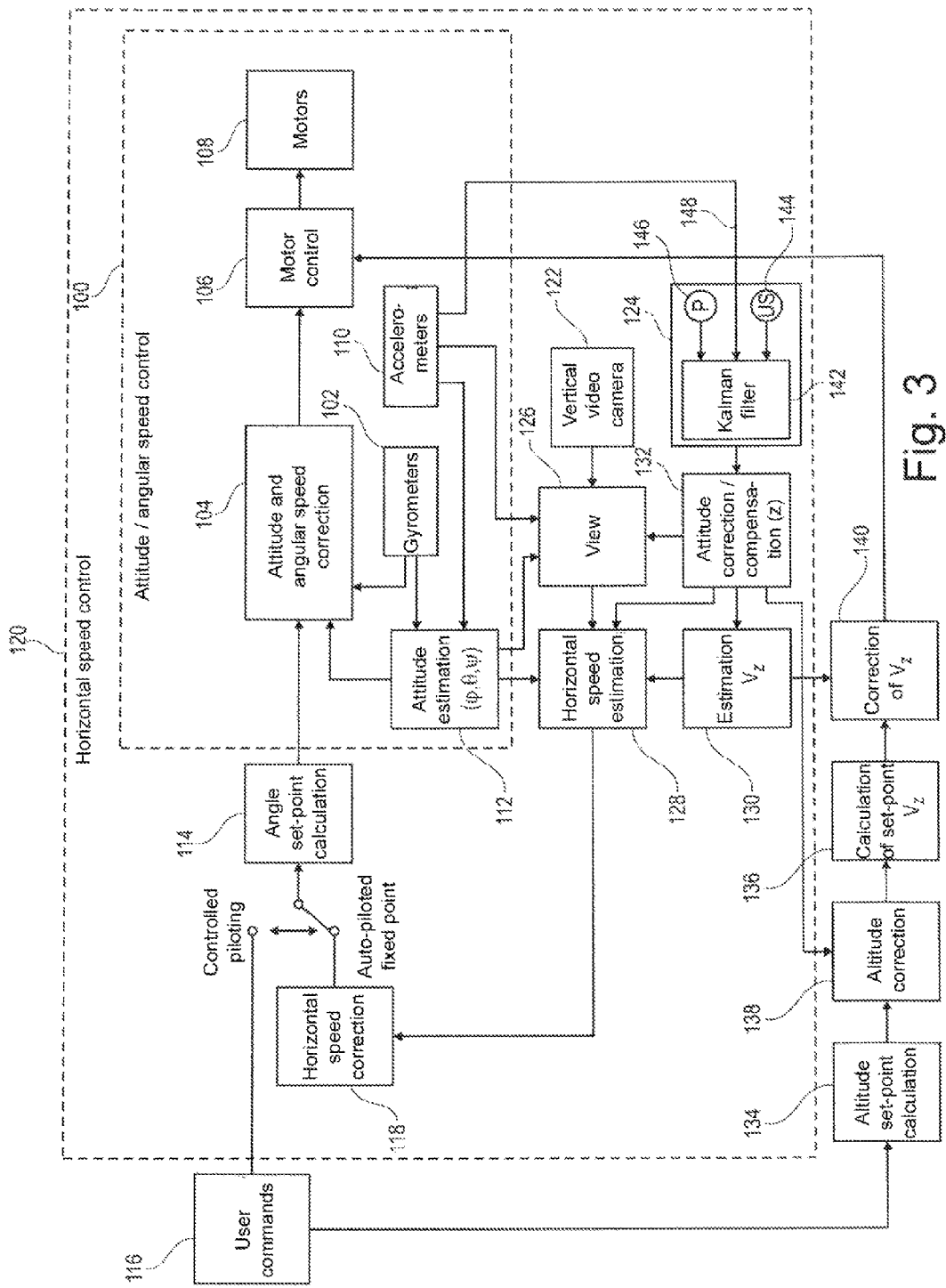
FIG. 3 is a block diagram of the various control, servo-control and assisted-piloting elements of the drone.

The four motors 18 are piloted independently from each other by an integrated navigation and attitude control system, which will be described in more detail with reference to FIG. 3.

Such a drone may be advantageously piloted through a phone or a multi-media player with a touch-screen and an integrated accelerometer, for example a cellular phone of the iPhone type or a multimedia tablet of the iPad type (registered trademarks of Apple Inc., USA). Such devices include the various control elements required for the detection of the piloting commands and the bidirectional exchange of data with the drone via a wireless link of the Wi-Fi (IEEE 802.11) or Bluetooth (registered trade-mark) local network type. They are furthermore provided with a touch screen allowing to display the image captured by the camera of the drone, with in superimposition a certain number of symbols allowing the activation of commands by simple contact of the user's finger on this touch screen.

Inertial sensors (accelerometers and gyrometers) measure with a certain accuracy the angular speeds and the attitude angles of the drone, i.e. the Euler angles (pitch $\phi$, roll $\theta$ and yaw $\psi$) describing the inclination of the drone with respect to a horizontal plane of a fixed terrestrial reference system, it being understood that the two longitudinal and transverse components of the horizontal speed are closely linked to the inclination about the two respective pitch and roll axes.

An ultrasound telemeter arranged under the drone and an on-board barometer sensor moreover provide measurements that, combined together, give an estimation of the altitude of the drone relative to the ground.

The drone also includes a vertical-view camera pointing downward, adapted to capture successive images of the overflown ground and used in particular to evaluate the speed of the drone relative to the ground.

The drone is provided with an automatic and autonomous system of stabilization in hovering flight, which is activated in particular as soon as the user removes his finger from the touch screen of the device, or at the end of the take-off phase, or in case of interruption of the radio link between the device and the drone. The drone then switches to a lift condition in which it is automatically immobilized and stabilized in this fixed position, with no intervention of the user.

For a more precise description of such a drone, reference may generally be made to the WO 2010/061099 A2 and EP 2 364 757 A1, as well as to FR 2 915 569 A1 (which describes in particular the system of gyrometers and accelerometers used by the drone), to the EP 2 431 084 A1 (which describes in particular how to control predetermined trajectories), and to the EP 2 644 240 A1 (which describes in particular the altitude estimator system based on the measurements of a barometer sensor and an ultra-sound sensor), all in the name of Parrot SA.

Figure 2:
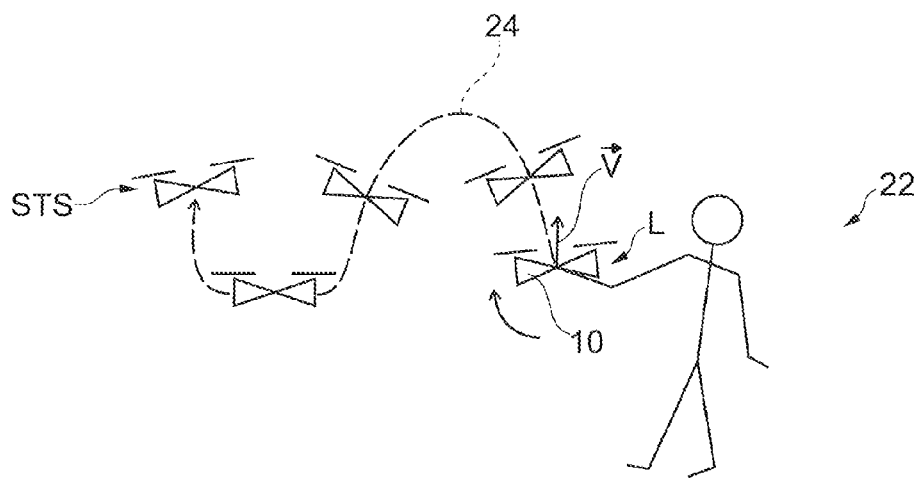
FIG. 2 schematically illustrates the initial phase of a beginning of flight with a "throw start".

With reference to FIG. 2, the object of the invention is to allow a "throw start" of the drone 10, in which a user 22 throws or releases the drone he has in his hand. The drone 10 then follows a trajectory 24, between an initial state L at the time where the user 22 throws it, motors turned-off, and a final state STS of stable lift state. The trajectory 24 is more or less erratic and a priori unpredictable, because it widely depends on the height at which the user 22 releases or throws the drone, of the initial speed V he imparts to it when he throws it, of a possible angular speed if the throw "spins out" instead of being flat, etc.

The matter is to manage this transition between the two initial and final states in a more efficient manner, by avoiding and minimizing the adverse phenomena (in particular a thrust of the motors that would tend to bring the drone closer to the ground), and this in a minimum time.

Control and Servo-Control of the Drone Motors

The general way the drone motor piloting set-points are elaborated will now be described with reference to FIG. 3, which is a block diagram of the various control and servo-control elements of the drone.

It will be noted that, although these diagrams are presented as interconnected circuits, the implementation of the different functions is essentially software-based, this representation being only illustrative.

The piloting system involves several interleaved loops for the control of the horizontal speed, of the angular speed and of the attitude of the drone, in addition to the altitude variations.

The most central loop, which is the attitude and angular speed control loop 100, uses the signals provided by gyrometers 102 and, in an attitude and angular speed correction stage 104, compares them to a reference consisted of angular speed set-points. This stage 104 pilots a stage 106 of control of the motors 108 in order to control separately the regime of the different motors to correct the angular speed of the drone by the combined action of the rotors driven by these motors.

The indication provided by the gyrometers 102 and by the accelerometers 110 are applied to a stage 112 of attitude estimation of the PI (Proportional-Integrator) type. The stage 112 produces an estimation of the real attitude of the drone (pitch $\phi$, roll $\theta$ and yaw $\psi$ angles), applied to the attitude and angular speed correction stage 104. This stage 10 compares the so-estimated attitude with angle set-points, generated by a circuit 114 based on commands directly applied by the user 116 ("controlled piloting" configuration) and/or based on data generated internally by the automatic pilot of the drone via a horizontal speed correction circuit 118 serving to hold the drone in a still lift position (auto-piloted "fixed point" configuration). The possibly corrected set-points applied to the stage 104 and compared with the estimated attitude of the drone are transmitted by the stage 104 to the stage 106 to suitably control the motors 108.

To sum up, based on the error between the set-point (applied by the user and/or generated internally) and the measurement of the angle (given by the attitude estimation circuit 112), the loop 100 calculates an angular speed set-point, then calculates the difference between this previous angular speed set-point and the angular speed effectively measured by the gyrometers 102. The loop 100 determines based on this information the different set-points of rotational speed (and hence of ascensional force), which are sent to the motors 108 to perform the maneuver asked by the user and/or planed by the automatic pilot of the drone.

The horizontal speed control loop 120 uses a vertical video camera 122 and an altitude estimator circuit 124 (described in more detail hereinafter). A circuit 126 ensures the processing of the images produced by the vertical camera 122, in combination with the signals of the accelerometer 110 and of the attitude estimation circuit 112, to estimate by means of a circuit 128 the two components of the horizontal speed of the drone. The estimated horizontal speeds are corrected by the vertical speed estimation given by a circuit 130 and by a value of the altitude obtained from the estimator 134 and from a circuit 132 of correction/compensation of the altitude values in some particular flight configuration of the drone.

As regards the vertical displacements of the drone, the user 116 applies commands to a circuit 134 of calculation of altitude set-points, such set-points being applied to a circuit 136 of calculation of climb rate set-point Vz via the altitude correction circuit 138 receiving the altitude estimation given by the circuit 132. The calculated climb rate speed Vz is applied to a circuit 140 that compares this set-point speed to the corresponding rate estimated by the circuit 140 and modifies consequently the motor control data (stage 106) to increase or reduce the rotational speed simultaneously on all the motors so as to minimize the difference between the set-point climb rate and the measured climb rate.

Estimation of the Drone Altitude

The way the altitude estimation circuit 124 and the estimated altitude value correction/compensation circuit 132 operate will now be described.

Herein, the word "altitude" means the value of the instantaneous position of the drone in the vertical direction, considered in a fixed terrestrial reference system such as a Galilean reference system, whose altitude zero corresponds to the position of the ground. This "altitude" is hence an absolute magnitude.

The way the altitude estimation circuit 124 operates will be first described.

This circuit implements a state estimator 142 of the "Kalman filter" type, which is an infinite impulse response filter estimating the states of a dynamic system (the drone in the present case) based on a series of measurements applied at the input. The general principles of this technique will be found, for example, in R. E. Kalman, A new Approach to Linear Filtering and Prediction Problems, Transactions of the ASME—Journal of Basic Engineering, Vol. 82 (1960).

In the present case, the Kalman filter receives as inputs:
  the signal delivered by an ultrasound sensor (US sensor) 144,
  the signal delivered by a barometer sensor 146, and
  in 148, the signal delivered by the accelerometers 110.

The dynamic system of the Kalman filter is consisted by a set of equations that describes the behavior of the drone. Such a modeling is exposed in particular in the above-mentioned EP 2 644 240 A1, to which reference may be made for further detail.

The Kalman filter 142 operates in two phases, with successively:
  a phase of prediction, carried out at each iteration of the filter: this phase consists in predicting the altitude of the drone at the current instant by means, on the one hand, of the accelerometer signal, and on the other hand, of the dynamic modeling of the drone; and
  a phase of adjustment, which consists in correcting the prediction using the current measurements delivered by the US sensor 144 and the barometer sensor 146. This step is not necessarily carried out at each iteration because the measurements of the US sensor are not necessarily always available, as will be explained hereinafter.

The Kalman filter uses and estimates four states, i.e.:
the altitude of the drone with respect to its starting point (position at the initial instant),
the vertical speed Vz,
the accelerometer bias, and
the bias of the pressure measurement delivered by the barometer sensor 146.

The accelerometer bias represents an error of measurement of the accelerometer z, which varies at low frequency in particular with the temperature. The latter is adjusted in flight by means of the measurements provided by the two sensors 144 and 146, which allows in particular to be more precise when these measurements disappear.

The bias state of the pressure measurement allows to correct the drifts of the barometer sensor 146. These latter appear mainly at the take-off, at the starting of the motors and during the first seconds of flight with the temperature increase. These drifts may also appear when the pressure environment is modified in other circumstances, for example when the drone evolves inside a room and a person opens a window of this room, etc. This bias state of the pressure measurement is estimated from measurements of the US sensor 154. When the US measurement is no longer available, for example when the drone no longer receives any echo, the bias state of the pressure measurement is no longer estimated, it is kept at a constant value.

To adjust the states of the filter, the latter uses three observations:
the distance measurement given by the US sensor 144 and possibly corrected by a so-called offset value. It will be noted that this observation is not always available: in optimum conditions, on a smooth ground and at low altitude, the measurement is provided at a recurrence frequency of 25 Hz, i.e. 1 time out of 8 with respect to the frequency of recalculation of the drone piloting data, which is typically of 200 Hz. On the other hand, the measurement may be rejected in case of reception of chaotic echoes;
the pressure measurement given by the barometer sensor 146 and corrected by its own offset. This measurement is generally present at each iteration, it is however deactivated when the drone is very close to the ground, typically at less than 20 cm from the ground, taken into account the disturbing hiss effects that cause strong interference to the pressure measurement; and
the zero altitude measurement, which is used only when the drone is not in flight; the matter is a virtual measurement that allows to be sure that the altitude value delivered to the navigation circuits remains fixed to zero.

Control of the Throw Start

Figure 4:
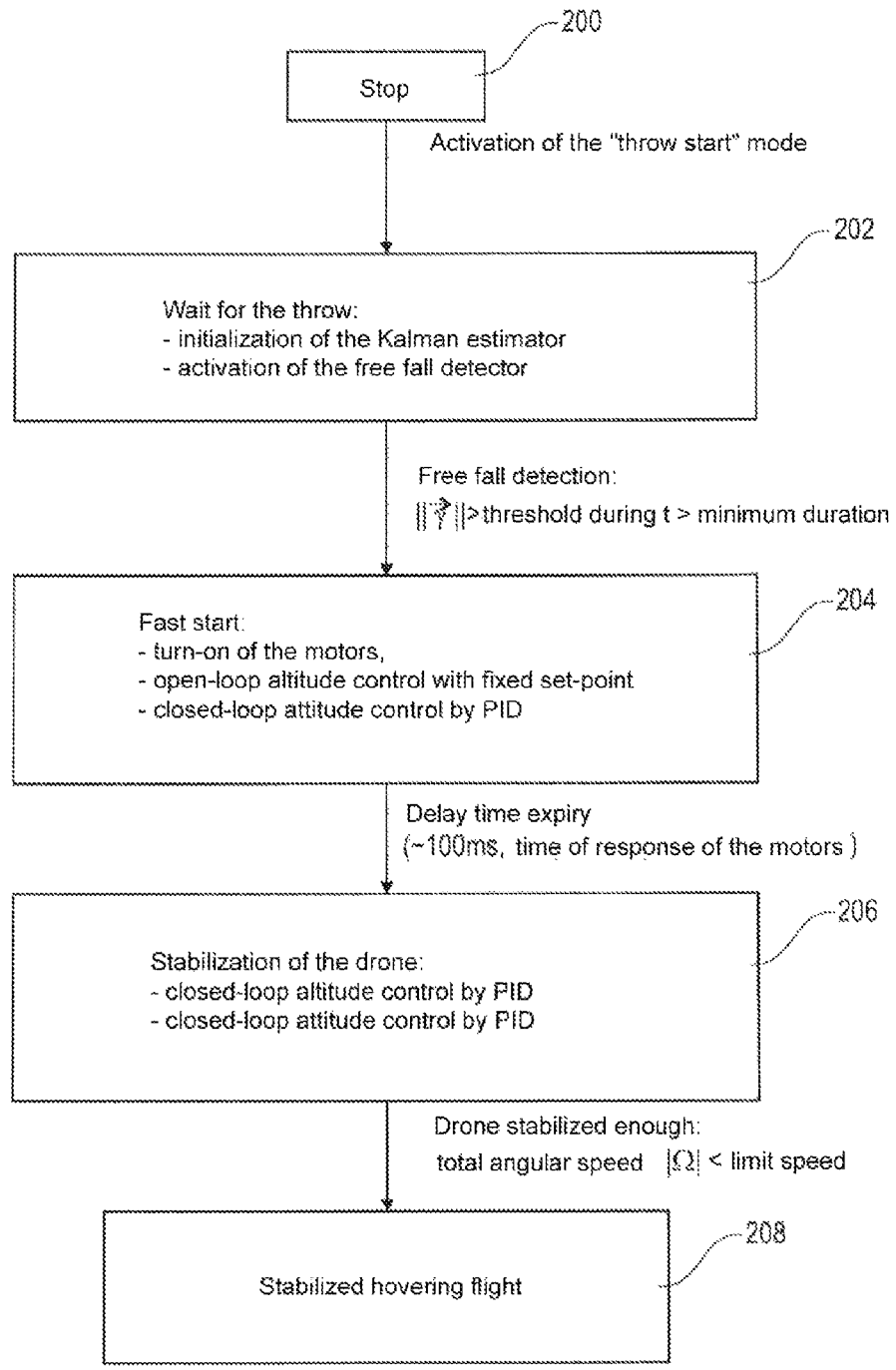
FIG. 4 is a flow chart detailing the different steps of the method of the invention, to allow the drone to switch from the initial state, with the motors turned-off, to the final state in a stabilized hovering flight.

FIG. 4 is a flow chart detailing the different steps allowing the drone to switch from an initial state, with the motors turned-off (step 200), to a final state in a stabilized hovering flight (step 208).

The user activates the "throw start" mode, for example by means of a button of the touch-interface of its remote-control device.

The drone then waits (step 202) for the throw by the user.

The motors remain turned-off, so as not to risk to injury the user.

The parameters of the Kalman filter 142 of the altitude estimator 124 are then initialized, in a specific manner proper to a throw start.

Indeed, in the case of a take-off from the ground, it is known that the altitude is zero and the vertical speed is zero; the initialization of the estimator is then very reliable, and it is possible to give to these states a very low initial variance, with an interval of confidence of the order of 1 mm/s for the vertical speed.

On the other hand, in the case of a throw start, the initial altitude and speed are not known. The initial conditions of the state vector, which contains in particular the altitude and the vertical speed, are then modified in the following manner, by choosing to initialize:
the altitude, approximately the height of a shoulder, i.e. about 1.50 m (typically 1 to 2 m) and
the vertical speed, at 70 cm/s, positive upward (typically 0 to 200 cm/s).

On the other hand, the vertical speed component of the state estimator will be strongly desensitized, due to the very high uncertainty about the value of the initialization. In order to be able to estimate very rapidly by means of the sensors the vertical speed, whose initial value is very uncertain, the interval of confidence of the initial speed is established at a value of the order of 1000 mm/s (typically, at a value comprised between 100 and 2000 mm/s). This will allow a faster convergence of the estimator in accord with the two US sensor 144 and barometer sensor 146, as will be illustrated hereinafter with reference to the example of FIGS. 7 and 8.

The drone is then ready to be thrown, the switching to the following step (step 202) being decided by a free fall detector, activated during this previous phase.

The free fall detection has for object to detect the throwing of the drone in order to start the motors the more rapidly possible, as soon as the user has released the drone.

The accelerometers 110 measure the acceleration of the drone in a terrestrial reference system, cut of the acceleration of the gravity field expressed in the local reference system of the drone: actually, when the drone is in free fall, the acceleration of its center of gravity is equal to the only force that is applied to the system, i.e. the gravity. This translates on the signals of the accelerometers by a zero measured acceleration.

The principle of the detection consists in determining the norm of the acceleration measurement, and in considering that a free fall is detected if this norm is lower than a given threshold S during a given minimum time. This threshold is for example fixed to S=4 m/s2, which allows to be robust to the bias of the sensor and to the non-zero acceleration component appearing when the drone is in rotation, due to the fact that the sensor is not at the center of inertia of the drone.

Figure 5:
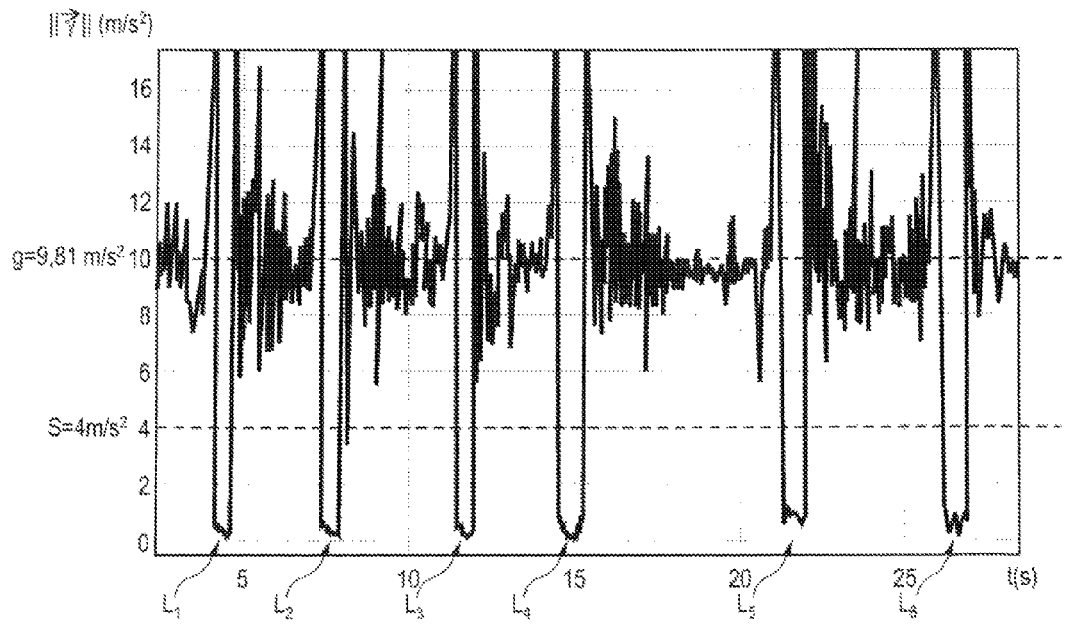
FIG. 5 is a chronogram illustrating the variations of the drone acceleration norm, measured for six successive throws.

FIG. 5 is a chronogram illustrating the variations of the norm of the acceleration measured for six successive throws L1 to L6. It is also shown in this figure the acceleration g of gravity and the threshold S of detection of the free fall condition.

Figure 6:
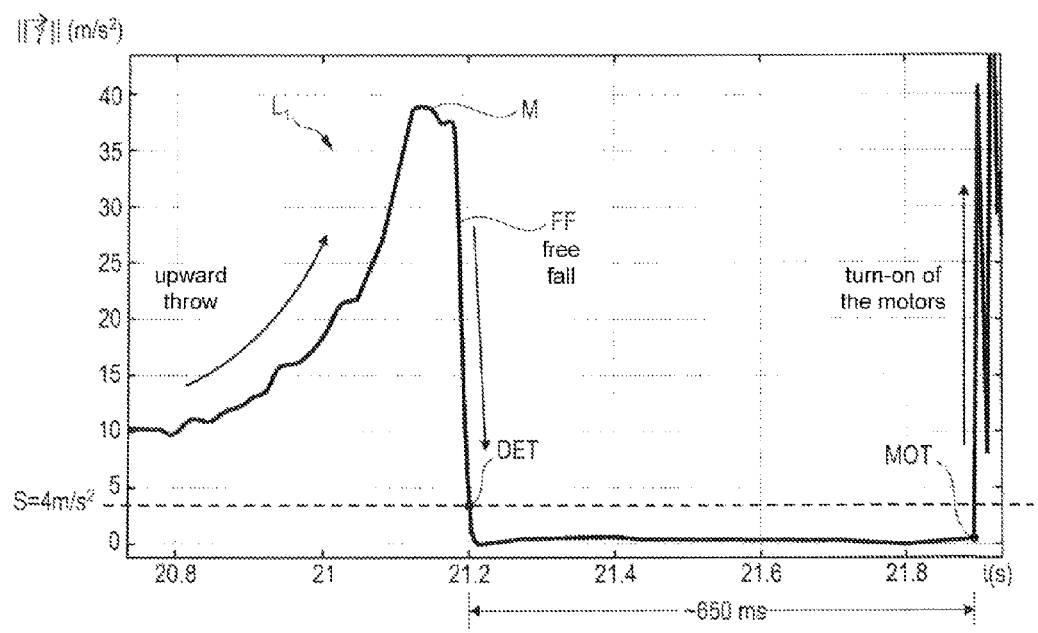
FIG. 6 is a chronogram illustrating, more precisely, the variations of the acceleration norm during the different phases in one of these throws.

FIG. 6 illustrates more precisely the variations of the acceleration norm for one of the throws.

In a first phase, corresponding to a throw of the drone upward by the user, the acceleration increases up to a maximum M, reached at the time when the drone leaves the hand of the user. It then follows that a phase of free fall FF with a fast diminution of the measured acceleration, down to the crossing of the corresponding threshold S at the instant DET of detection of the free fall condition. This free fall continues until the starting of the motors at the instant MOT, after a few hundreds of milliseconds. The acceleration increases again because the drone is then no longer subjected to the only force of gravity but also to the lift force of the motors that propel it.

The detection of the free fall triggers not only the turn-on of the motors, but also the activation of the attitude and altitude control loops (step 204).

It will be noted that, insofar as the start is made motors turned-off, it is advantageous to equip the drone with brush-motors (rather than brushless motors) due to their very low time of response to turn-on, typically of about 100 ms.

Characteristically of the invention, in this phase that follows immediately the starting of the motors, the altitude control is an open-loop control with a fixed set-point, equal to the previously estimated feedforward value, which allows to ensure the starting of the four motors with an average set-point about which the attitude control loop will be able to operate. The open-loop operation of the altitude control allows not to propagate the effects of the adjustment of the altitude estimator towards the motor commands.

As regards the attitude control, the latter is operated in closed loop, with a zero trim and a heading angle equal to the current heading. The servo-control is known per se, a quaternion PID (Proportional-Integrator-Differentiator) servo-control for the trim set-points (controlled angles θ and ϕ), and a controller D on the heading, i.e. the control is expressed by: $U_\psi = -K_p \psi$ and the latter is saturated.

This fast start state is maintained for the duration of a predetermined delay time of the order of magnitude of the time of response of the motors, i.e. about 100 ms.

After this fast start (step 204), the following phase (step 206) is a phase of stabilization of the drone in which the altitude control is ensured by a PID servo-control now in closed loop, with an altitude reference fixed for example to 1.50 m. On the other hand, the attitude control is not modified and it is identical to what has been described hereinabove for the phase of fast start of step 204.

This step 206 of stabilization of the drone is continued the time required to ensure the stabilization of the drone.

It is considered that the drone is stabilized enough when its total angular speed 101 is lower than a predetermined threshold, for example 90°/s.

The duration of this stabilization phase is very variable: short if the drone is thrown according to a flat movement, far longer if it is thrown according to a spin movement.

The final step (step 208) is that of a hovering flight stabilized enough so that the control can be given back to the user, the drone then quitting the auto-piloted mode of operation upon throw start.

Figure 7:
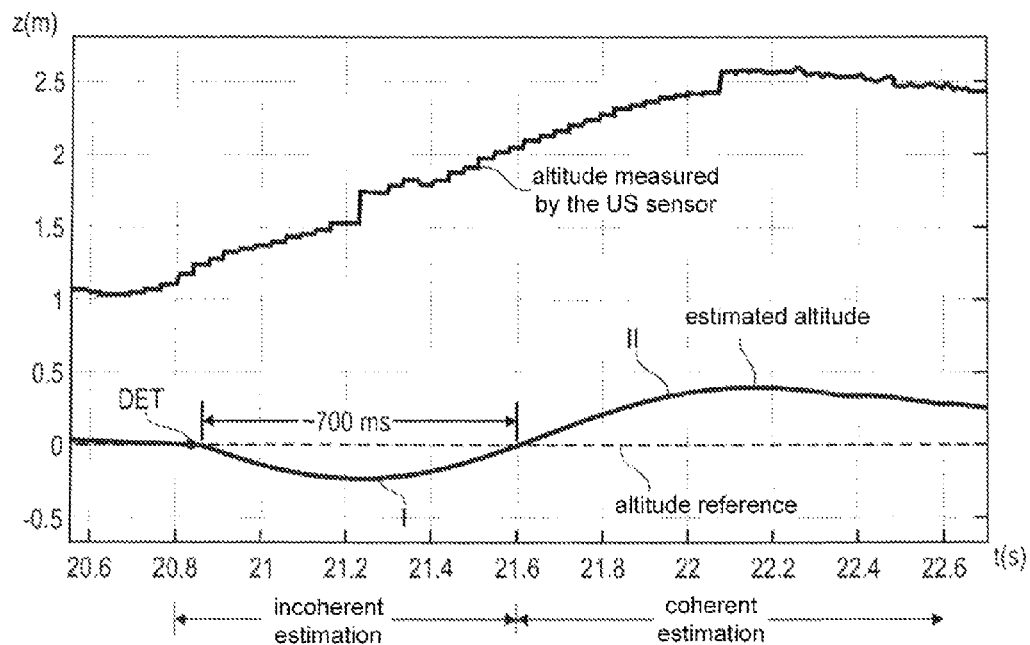
FIGS. 7 and 8 illustrate results of tests, with and without specific initialization of the altitude estimator, respectively, comparing the real altitude data, measured by a sensor of the drone, with the estimates of these data produced during the phase of stabilization of the drone. An embodiment of the invention will now be described by way of illustration.
Figure 8:
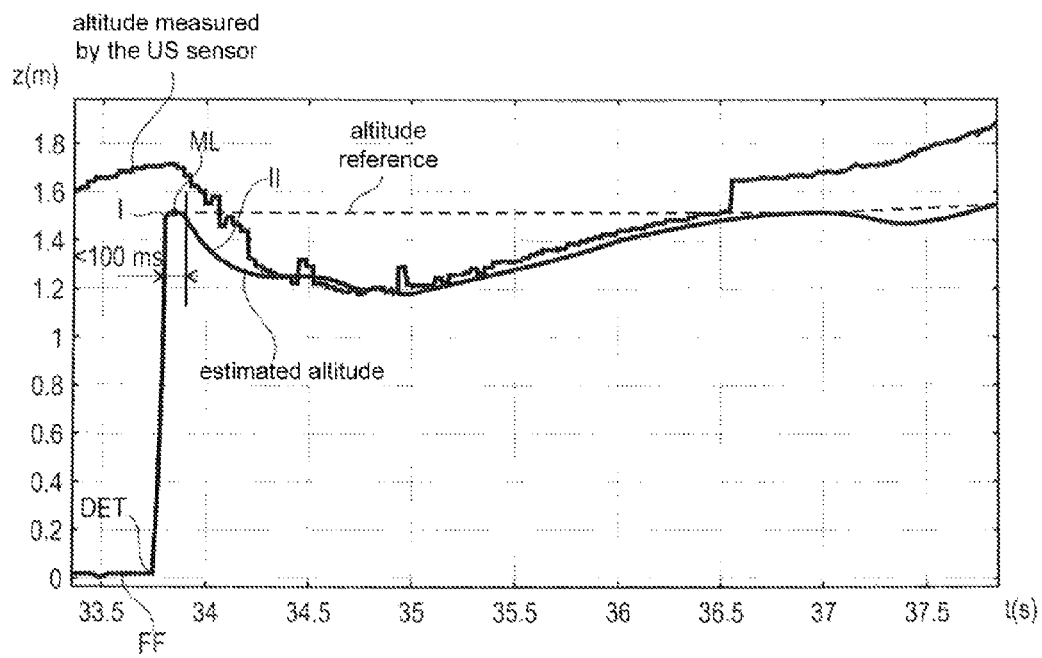

FIGS. 7 and 8 illustrate results of tests, with and without specific initialization of the altitude estimator, respectively, allowing to compare the real altitude data, measured by the ultrasound sensor of the drone (US sensor 114 in FIG. 3), with the estimates of these data produced during the phase of stabilization of the drone.

FIG. 7 corresponds to the case of a throw start with a non-modified initialization of the Kalman filter, i.e. a conventional initialization for a start of the drone from the ground: zero altitude, zero vertical speed and very small interval of confidence (of the order of 1 mm/s).

It has been illustrated in this figure:
the altitude measured by the US sensor 144 (i.e. the value towards which the altitude estimator 124 must converge);
the altitude estimate such as produced by the Kalman filter 142; and
a constant altitude reference, equal to zero.

With such initialization parameters, when the drone is thrown by hand (for example at a height of the order of 1 m) instead of taking-off from the ground, from the moment of free fall detection DET, the altitude increases due to the impulse imparted upward by the user. It follows a first phase I in which the estimation is incoherent, i.e. the estimated altitude decreases and takes a negative value, whereas in reality the altitude increases. This phase of incoherent estimation may be continued during several hundreds of milliseconds (about 700 ms in the illustrated example) before the estimated altitude becomes again positive and growing (phase II of coherent estimation). Hence, the convergence of the estimation to the measurement requires several hundreds of milliseconds, a period during which the motors will be controlled in an also incoherent manner, i.e. they will exert a thrust in the bad direction and will tend to push the drone towards the ground instead of moving it away therefrom.

FIG. 8 is similar to FIG. 7, but with an initialization of the Kalman filter specially adapted to a throw start, as explained hereinabove.

In this example, the altitude is initialized at 1.50 m (instead of zero) and the vertical speed at 70 cm/s, positive upward (instead of zero). The vertical speed component of the state estimator is also strongly desensitized, with a very wide interval of confidence, fixed in this example at 1000 mm/s (instead of 1 mm/s).

As can be seen, from the instant DET of the free fall detection, the estimated value of the altitude reaches very rapidly a local maximum ML, to then go back down, so that the duration of the incoherent estimation phase I is extremely reduced, of the order of 100 ms, corresponding to the time of response of the motors. The following phase II is a phase of coherent estimation, which will allow the estimator to converge in a short delay towards the real altitude, as measured by the ultrasound sensor.

The invention claimed is:

1. A method of dynamic control of a rotary-wing drone with multiple rotors driven by respective motors with application of differentiated motor commands to pilot the drone in attitude, altitude and speed, this method being a method for operating a transition:
   from an initial state, in which the drone has its motors turned-off,
   to a final state, in which the drone is in a lift condition, and from which the drone can be piloted by a user,
   the drone comprising:
      an accelerometer adapted to deliver values of acceleration of the drone;
      a gyrometer adapted to deliver values of angular speed of the drone;
      an altimeter adapted to deliver a value of altitude of the drone;
      an altitude control means comprising a servo-controlled loop operating based on an altitude set-point; and
      an attitude control means comprising a servo-controlled loop operating based on an attitude set-point,
   said method comprising steps of:
      throwing of the drone in the air from the initial state, motors turned-off;
      turning on the motors and activation of the altitude control means and attitude control means; and
      stabilizing the drone in a lift condition at the final state,
   said method being characterized in that,
   the altimeter means comprises a predictive-filter estimator that incorporates a representation of a dynamic model of the drone and operates based on a state vector containing altitude and horizontal speed variables, said method comprising the following successive steps:
   a) initializing the predictive-filter estimator;
   b) throwing the drone in the air by the user from an initial state, with the motors turned-off;

c) detecting a free fall state such that the norm of the drone acceleration is lower than a predetermined threshold for a predetermined minimum duration;
d) upon detection of said free fall state, fast starting by:
    turning on the motors,
    open-loop activation of the altitude control means, and
    closed-loop activation of the attitude control means;
e) then, after a duration at least equal to a time of response of the motors to said turn-on, stabilizing the drone by:
    closed-loop activation of the altitude control means, and
    closed-loop activation of the attitude control means;
f) detection of a stabilization state such that the norm of the total angular speed of the drone is lower than a predetermined threshold; and
g) upon detection of the stabilization state, switching to the final state.

2. The method of claim 1, wherein the step a) of initializing the predictive-filter estimator comprises initializing the state vector with an altitude variable between 1 m and 2 m.

3. The method of claim 1, wherein the step a) of initializing the predictive-filter estimator comprises initializing the state vector with a vertical speed variable positive upward and comprised between 0 and 200 cm/s.

4. The method of claim 1, wherein the step a) of initializing the predictive-filter estimator comprises initializing an interval of confidence of the initial speed of the drone at a value that is between 100 mm/s and 2000 mm/s.

5. The method of claim 1, wherein, at step d), the altitude control means activated in open loop operates based on a fixed altitude set-point that corresponds to the initial state of the altitude estimator.

6. The method of claim 1, wherein, at step e), the altitude control means activated in closed loop operates based on a predetermined fixed altitude set-point.

7. The method of claim 1, wherein, at steps d) and e), the attitude control means activated in closed loop operates based on a zero trim set-point and a heading set-point that corresponds to the current heading with a zero angular speed set-point.

* * * * *